(12) United States Patent
Tian et al.

(10) Patent No.: US 10,777,987 B2
(45) Date of Patent: Sep. 15, 2020

(54) ANTI-WRING COMPONENT, GIMBAL AND FLYING VEHICLE

(71) Applicant: Haoxiang Electric Energy (Kunshan) Co., Ltd., Kunshan, Jiangsu (CN)

(72) Inventors: Yu Tian, Jiangsu (CN); Wenyan Jiang, Jiangsu (CN)

(73) Assignee: Haoxiang Electric Energy (Kunshan) Co., Ltd., Kunshan, Jiangsu (CN)

( * ) Notice: Subject to any disclaimer, the term of this patent is extended or adjusted under 35 U.S.C. 154(b) by 85 days.

(21) Appl. No.: 15/854,771

(22) Filed: Dec. 27, 2017

(65) Prior Publication Data
US 2018/0138684 A1    May 17, 2018

(30) Foreign Application Priority Data

Dec. 29, 2016   (CN) .......................... 2016 1 1250896

(51) Int. Cl.
| | |
|---|---|
| B64D 47/00 | (2006.01) |
| H02G 11/02 | (2006.01) |
| B64D 47/08 | (2006.01) |
| G03B 15/00 | (2006.01) |
| G03B 17/56 | (2006.01) |
| B64C 39/02 | (2006.01) |
| H04N 5/225 | (2006.01) |
| H04N 7/10 | (2006.01) |

(52) U.S. Cl.
CPC ............. *H02G 11/02* (2013.01); *B64D 47/08* (2013.01); *G03B 15/006* (2013.01); *G03B 17/561* (2013.01); *B64C 39/024* (2013.01); *B64C 2201/127* (2013.01); *H04N 5/2253* (2013.01); *H04N 7/10* (2013.01)

(58) Field of Classification Search
CPC ...... H02G 11/02; B64D 47/08; G03B 15/006; G03B 17/561; B64C 39/024; B64C 2201/127; H04N 5/2253; H04N 7/10
USPC ............................................................ 248/51
See application file for complete search history.

(56) References Cited

U.S. PATENT DOCUMENTS

| | | | | |
|---|---|---|---|---|
| 6,494,396 B2* | 12/2002 | Sugata | .................. | B60R 16/027 242/388 |
| 6,572,393 B2* | 6/2003 | Kawamura | ........... | B60R 16/027 439/164 |
| 6,835,078 B2* | 12/2004 | Maegawa | .............. | B60R 16/027 439/164 |
| 7,315,681 B2* | 1/2008 | Kewitsch | ............. | G02B 6/4457 385/135 |

(Continued)

*Primary Examiner* — Nkeisha Smith

(57) ABSTRACT

An anti-wring component, a gimbal and a flying machine are disclosed in the present invention. The anti-wring component comprises a wire spool and a supporting locating piece, wherein the wire spool is fixed on the supporting locating piece; the wire spool comprises an anti-wring cylinder; a cord hole is set on the anti-wring cylinder for a multi-wire planar cable to go inside; wire lead-out holes are set on the anti-wring cylinder for the multi-wire planar cable to pass through; a limiting boss is set on the anti-wring cylinder for limiting the multi-wire planar cable. The gimbal comprises a roll axis U-shape arm and the anti-wring component; wherein the supporting locating piece is fixed on the roll axis U-shape arm. The flying vehicle comprises the gimbal. The present invention prevents the multi-wire planar cable from wring and ensures a normal transmission of data and image signals.

8 Claims, 8 Drawing Sheets

(56) References Cited

U.S. PATENT DOCUMENTS

| | | | | |
|---|---|---|---|---|
| 9,663,244 B2* | 5/2017 | Zhao | ................... | F16M 11/10 |
| 9,813,797 B2* | 11/2017 | Abfall | ................... | H04R 1/1033 |
| 10,138,089 B2* | 11/2018 | Chen | ................... | H02G 11/02 |
| 10,432,863 B2* | 10/2019 | Appel | ................... | H04N 7/10 |
| 2006/0157608 A1* | 7/2006 | Liao | ................... | B65H 75/4431 |
| | | | | 242/378.4 |
| 2008/0203205 A1* | 8/2008 | Douty | ................... | H02G 3/0406 |
| | | | | 242/171 |
| 2009/0139138 A1* | 6/2009 | Agullo | ................... | A01G 9/126 |
| | | | | 47/46 |
| 2009/0166462 A1* | 7/2009 | Chang | ................... | B65H 75/4434 |
| | | | | 242/375 |
| 2017/0275133 A1* | 9/2017 | Chen | ................... | B65H 75/486 |

* cited by examiner

US 10,777,987 B2

ANTI-WRING COMPONENT, GIMBAL AND FLYING VEHICLE

CROSS REFERENCE OF RELATED APPLICATION

The present invention claims priority under 35 U.S.C. 119(a-d) to CN 201611250896.4, filed Dec. 29, 2016.

BACKGROUND OF THE PRESENT INVENTION

Field of Invention

The present invention relates to a flying vehicle field, and more particularly to a anti-wring component, a gimbal and a flying vehicle.

Description of Related Arts

A camera and a tripod are carried under the unmanned flying vehicle for an aerial photography and camera shooting, wherein the camera is set on a pitch axis of the gimbal while the control panel and the Wifi panel are set on other component to reduce the size of the pitch axis structure; A FPC (Flexible printed circuit) cable is required for transmitting images and data from the camera to the control panel and Wifi panel. The FPC cable moves with the movement of the pitch axis and the gimbal; wherein the twist of the FPC cable may effects the transmission of the data and image signals. The anti-wring performance of the conventional gimbal needs improving, which is not able to ensure a normal and continuous transmission of data and image signals.

SUMMARY OF THE PRESENT INVENTION

An object of the present invention is to provide an anti-wring component, a gimbal and a flying vehicle to solve the problem of discontinuous transmission of data and image signals due to inadequate anti-wring performance of the conventional gimbal.

The present invention provides an anti-wring component, comprising a wire spool and a supporting locating piece; wherein the wire spool is fixed on the supporting locating piece; the wire spool comprises an anti-wring cylinder; on a first end of the anti-wring cylinder there is a cord hole for a multi-wire planar cable to go inside the anti-wring cylinder; two wire lead-out holes are opened on an inner peripheral wall for the multi-wire planar cable inside the anti-wring cylinder to go out from the anti-wring cylinder; a limiting boss is along an circumference of a second end of the anti-wring cylinder for limiting the multi-wire planar cable going out from the wire lead-out holes on a peripheral wall of the anti-wring cylinder.

Furthermore, the anti-wring component comprises a bearing, wherein an outer ring of the bearing is fixed with a connector between a pitch axis and a roll axis of a gimbal; an inner ring of the bearing is fixed with the supporting locating piece.

Furthermore, the supporting locating piece comprises a mounting flange and a hollow shaft; the mounting flange is fixed with a first end of the hollow shaft; a shaft shoulder is set on the hollow shaft; the inner ring of the bearing is put on the hollow shaft and is limited by the shaft shoulder.

Furthermore, there are two wire lead-out holes which are set symmetrically along a radial direction of the anti-wring cylinder.

Furthermore, first mounting holes are set on the first end of the anti-wring cylinder.

Furthermore, second mounting holes are set on a second end of the hollow shaft.

Furthermore, a limiting groove is set on the mounting flange.

Furthermore, the bearing is a flange bearing.

The present invention provides a gimbal, comprising a roll axis U-shape arm and the anti-wring component; wherein the supporting locating piece is fixed on the roll axis U-shape arm.

The present invention provides a flying vehicle, comprising the gimbal.

Compared with the conventional technology, the benefits of the present invention are as follow.

The present invention provides an anti-wring component, comprising a wire spool and a supporting locating piece; wherein the wire spool is fixed on the supporting locating piece; the wire spool comprises an anti-wring cylinder; on a first end of the anti-wring cylinder there is a cord hole for a multi-wire planar cable to go inside the anti-wring cylinder; two wire lead-out holes are opened on an inner peripheral wall for the multi-wire planar cable inside the anti-wring cylinder to go out from the anti-wring cylinder; a limiting boss is along an circumference of a second end of the anti-wring cylinder for limiting the multi-wire planar cable going out from the wire lead-out holes on a peripheral wall of the anti-wring cylinder. While using the anti-wring component, the supporting locating piece is fixed on the roll axis U-shape arm; then one end of the multi-wire planar cable is connected to the control panel and Wifi panel; the other end of the multi-wire planar cable goes through the cord hole and out of the wire lead-out hole before circling around the peripheral wall of the anti-wring cylinder and connecting to the camera; the multi-wire planar cable rotates with the camera without twist when the camera rotates along the pitch axis; the rotation of the camera tightens the multi-wire planar cable around the anti-wring cylinder, which prevents the multi-wire planar cable from twist; the limiting boss prevents the multi-wire planar cable circling around the peripheral wall of the anti-wring cylinder from sliding off the anti-wring cylinder; the anti-wring component prevents the multi-wire planar cable from wring to ensure the continuous transmission of data and image signals.

The present invention also provides a gimbal which comprises roll axis U-shape arm and the anti-wring component; the supporting locating piece is fixed on the roll axis U-shape arm. The gimbal provided by the present invention prevents the multi-wire planar cable from wring and ensures the continuous transmission of the data and image signals.

The present invention also provides a flying vehicle which comprises the gimbal. The flying vehicle provided by the present invention prevents the multi-wire planar cable from wring and ensures the continuous transmission of the data and image signals.

BRIEF DESCRIPTION OF THE DRAWINGS

In order to better illustrate the embodiments of the present invention and conventional technical solution, a brief introduction of the drawings required are listed below. Obviously, the drawings described below just part of embodiments of the present invention. For a skilled technician in the field, other drawings are able to be achieved based on the drawings described below without innovative efforts.

ELEMENT NUMBER

Figure 1:
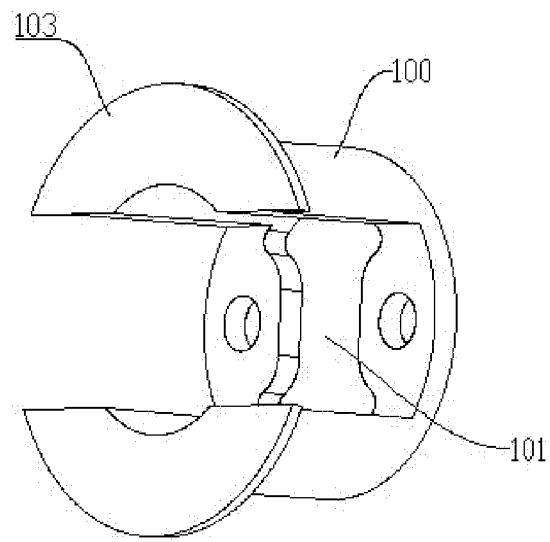
FIG. 1 is a perspective view of a structure of a wire spool according to a preferred embodiment of the present invention.
Figure 2:
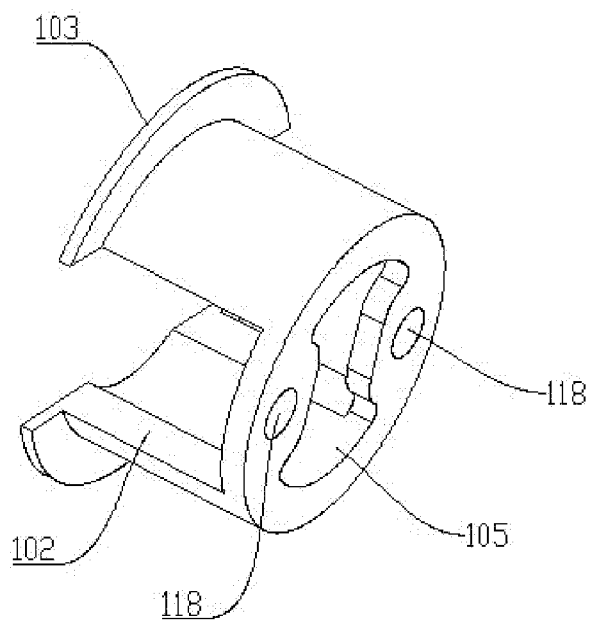
FIG. 2 is a perspective view of the structure of the wire spool from a different angle according to a preferred embodiment of the present invention.
Figure 3:
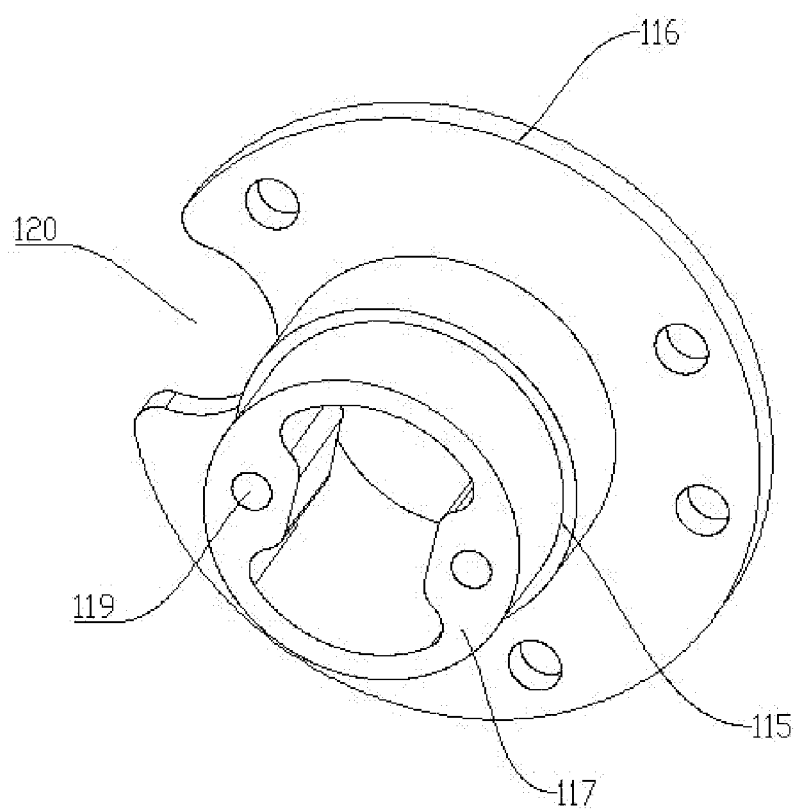
FIG. 3 is a perspective view of a structure of a supporting locating piece according to a preferred embodiment of the present invention.
Figure 4:
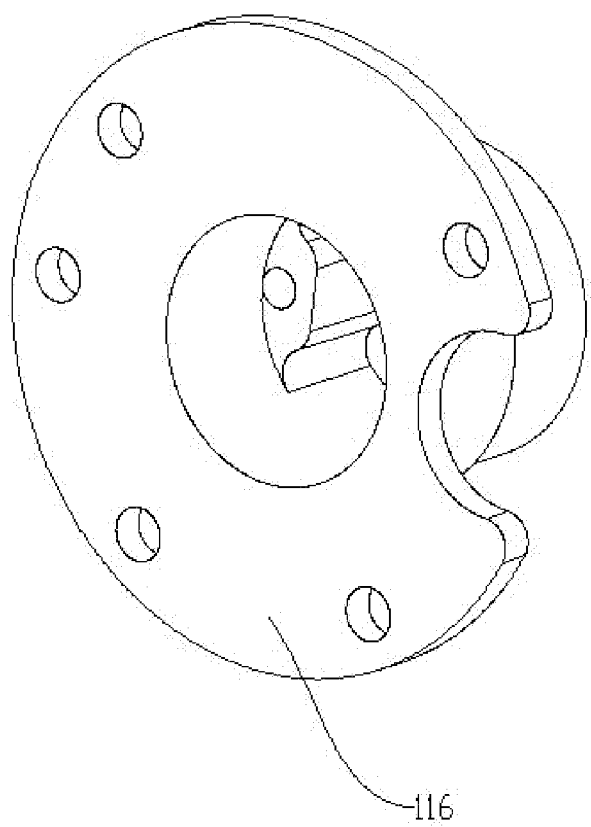
FIG. 4 is a perspective view of a structure of the supporting locating piece from a different angle according to a preferred embodiment of the present invention.
Figure 5:
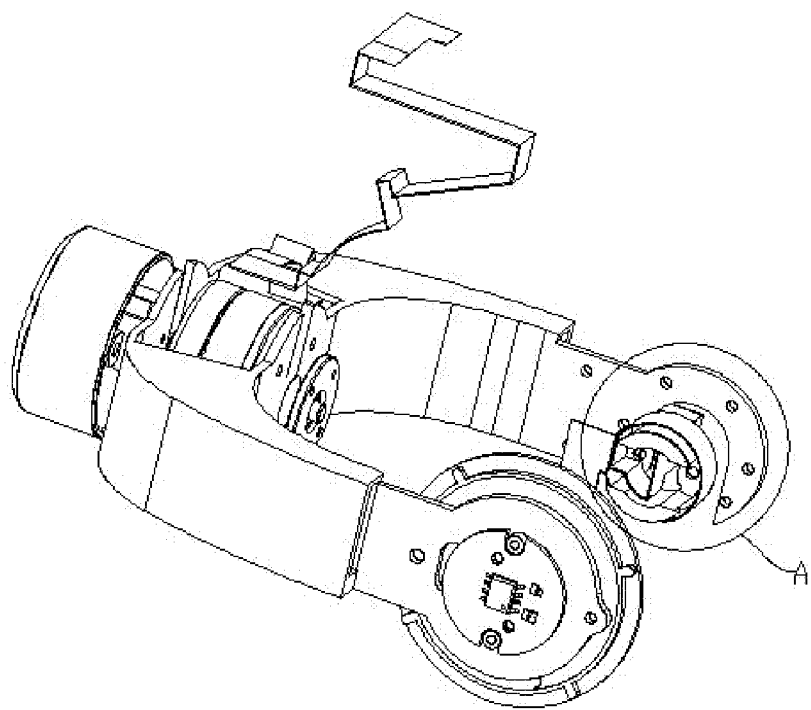
FIG. 5 is a perspective view of a structure of a multi-wire planar cable circling around the wire spool according to a preferred embodiment of the present invention.
Figure 6:
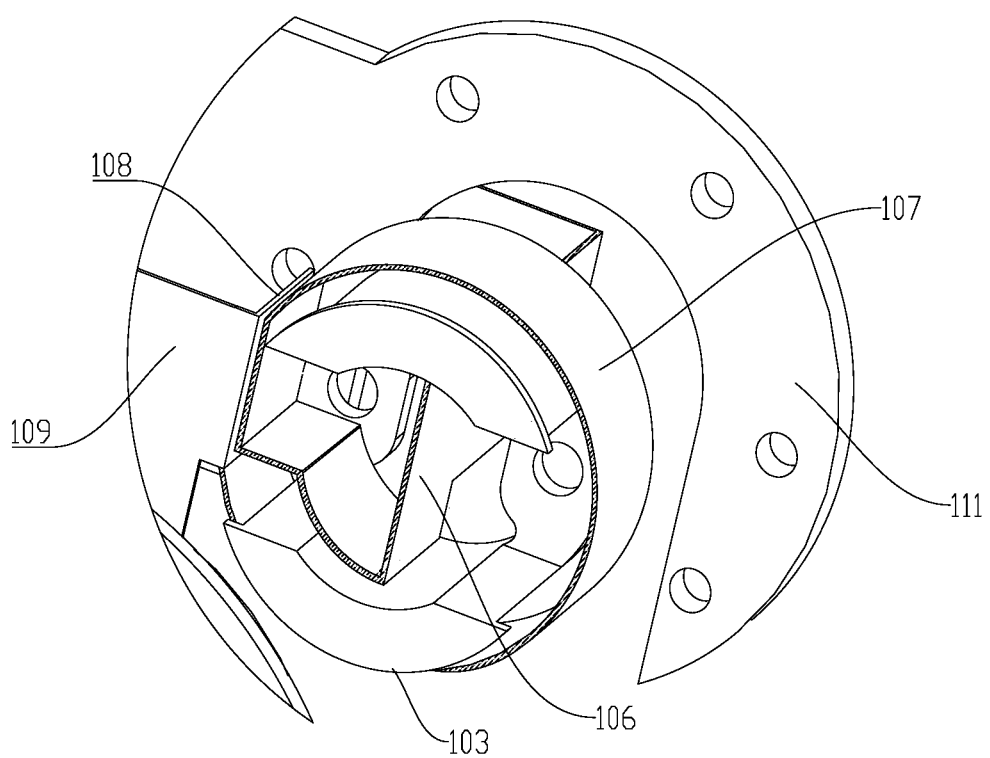
FIG. 6 is an enlarged perspective view of part A in the FIG. 5.

100—anti-wring cylinder; 101—cord hole; 102—wire lead-out hole; 103—limiting boss; 104—multi-wire planar cable; 105—arched end; 106—first plane part; 107—second curved part; 108—third plane part; 109—fourth plane part; 110—fifth plane part; 111—roll axis U—shape arm; 112—flange bearing; 113—connector between pitch axis and roll axis; 114—camera; 115—shaft shoulder; 116—mounting flange; 117—hollow shaft; 118—first mounting hole; 119—second mounting hole; 120—limiting groove; 121—earmuff; 122—wire spool; 123—supporting locating piece.

DETAILED DESCRIPTION OF THE PREFERRED EMBODIMENT

Referring to the drawings, the technical solution of the present invention is clearly and fully described. Obviously, the embodiments are just part of the embodiments of the present invention. Other embodiments based on the embodiments of the present invention achieved by a skilled technician in the field without innovative efforts are within the protection range of the present invention.

The terminologies adopted in the present invention, such as middle, upper, lower, left, right, vertical, horizontal, inner, outer and etc., indicate directions and positions illustrated in the drawings, which are for the convenience of simplifying the description of the present invention and not an indication or implication of the components or device must be settled in the specific position, be constructed in the specific direction or be operated in the specific way. The terminologies are not a limitation of the present invention. Besides, the terminologies, such as first, second and third, are just for the convenience of description and not an indication or implication of the priority.

The terminologies, such as mount, join and connect, are generalized concepts except being specified otherwise, which are able to describe fixed connection, detachable connection, integrated connection, mechanic connection, electric connection, direct connection, indirect connection or internal connection of two components in the present invention. A skilled technician in the field is able to interpret the terminologies according to specific situations.

Embodiment 1

Referring to FIG. 1 to FIG. 6, an anti-wring component applied on a gimbal is provided in the embodiment of the present invention, which comprises a wire spool 122 and a supporting locating piece 123; wherein the wire spool 122 is fixed on the supporting locating piece 123; the wire spool 122 comprises an anti-wring cylinder 100; on a first end of the anti-wring cylinder 100 there is a cord hole 101 for a multi-wire planar cable 104 to go inside the anti-wring cylinder 100; two wire lead-out holes 102 are opened on an inner peripheral wall of the anti-wring cylinder 100 for the multi-wire planar cable 104 inside the anti-wring cylinder 100 to go out from the anti-wring cylinder 100; a limiting boss 103 is along an circumference of a second end of the anti-wring cylinder 100 for limiting the multi-wire planar cable 104 going out from the wire lead-out holes 102 on a peripheral wall of the anti-wring cylinder 100.

Specifically, the multi-wire planar cable 104 is a FPC cable or a FFC cable; a middle part of the cord hole 101 is curved toward a radial axis of the anti-wring cylinder, which is able to limit the multi-wire planar cable 104; the cord hole 101 has two arched ends 105 which relive an edge abrasion on the multi-wire planar cable 104. The multi-wire planar cable 104 comprises a first plane part 106, a second curved part 107, a third plane part 108, a fourth plane part 109 and a fifth plane part 110 which are connected in sequence; a first plane part 106 is parallel with the cord hole 101 lengthwise; the first plane part 106 fits into the cord hole 101; the second curved part 107 circles around the peripheral wall of the anti-wring cylinder 100; the second curved part 107 fits closely with the peripheral wall of the anti-wring cylinder 100; the third plane part 108 is vertical to the fourth plane part 109; the fifth plane part 110 is vertical to the fourth plane part 109, wherein the third plane part 108 is vertical to the fifth plane part. The wire lead-out hole 102 is opened near to a second end of the anti-wring cylinder 100, which is convenient for winding and settling the multi-wire planar cable 104. Conventionally, the gimbal comprises motors to drive the three axes to rotate, which are pitch axis motor controlling pitch rotations, yaw axis motor controlling yaw rotations and roll axis motor controlling roll rotations. The multi-wire planar cable 104 is able to be contained in the anti-wring component.

The anti-wring component is used in the following way. The supporting locating piece is fixed on the roll axis U-shape arm 111 of the gimbal. One end of the multi-wire planar cable 104 is connected to the control panel; the other end goes through the cord hole 101 and out of the wire lead-out hole 102 before circling around the peripheral wall of the anti-wring cylinder 100 and being connected to the camera 114. When the camera 114 rotates around the pitch axis 114, the multi-wire planar cable 104 does not wring; the rotation of the camera 114 tightens the multi-wire planar cable 100 around the anti-wring cylinder 100 and prevents the multi-wire planar cable 100 from wringing. The limiting boss 103 prevents the multi-wire planar cable 104 around the peripheral wall of the anti-wring cylinder 100 from sliding off the anti-wring cylinder 100. The anti-wring component prevents the multi-wire planar cable 104 from wringing and ensures the normal transmission of the data and the image signals.

The anti-wring component in the embodiment further comprises a bearing, wherein the outer ring of the bearing is fixed with the connector 113 between the pitch axis and the roll axis; the inner ring of the bearing is fixed with the supporting locating piece.

Specifically, the connector 113 between the pitch axis and roll axis rotates with the camera 114 around the pitch axis of the gimbal; the connector 113 between the pitch axis and the roll axis is connected with the supporting locating piece by a bearing; the supporting locating piece is fixed on the roll axis U-shape arm 111; the rotation of camera 114 around the pitch axis tightens the second curved part 107 of the multi-wire planar wire 104 around the anti-wring cylinder 100; the second curved part 107 is tightened and the multi-wire planar cable 104 does not wring; the continuous transmission of the data and image signals is thus guaranteed.

The supporting locating piece in the embodiment comprises a mounting flange 116 and a hollow shaft 117; the mounting flange 116 is fixed with one end of the hollow shaft 117; a shaft shoulder 115 is set on the hollow shaft 117; the inner ring of the bearing is put on the hollow shaft 117 and is limited by the shaft shoulder 115.

Specifically, the cross section of the hollow shaft 117 and the cross section of the cord hole 101 are in the same shape. The mounting flange 116 is fixed with the roll axis U-shape arm 111 by screws. The mounting flange 116 and the connector 113 between the pitch axis and roll axis are set on two sides of the roll axis U-shape arm of the gimbal respectively. The inner ring of the bearing is fixed with the hollow shaft 117.

There are two wire lead-out holes 102 in the embodiment. The two wire lead-out holes 102 are set symmetrically along a radial direction of the anti-wring cylinder 100. Different types of multi-wire planar cable 104 are able to conveniently go through any one of the wire lead-out holes 102.

A first mounting hole 118 is on a first end of the anti-wring cylinder 100 in the embodiment. A second mounting hole 119 is on a second end of the hollow shaft 117. A screw passes through the first mounting hole 118 on the anti-wring cylinder 100 and the second mounting hole 119 on the hollow shaft 117 to fix the anti-wring cylinder 100 and the hollow shaft 117 together. There are two first mounting holes 118 and two second mounting holes 119. The two first mounting holes 118 are set along the length of the cord hole 101 and on two sides of the curved part respectively. The second mounting holes 119 are set on the hollow shaft 117 correspondingly to the first mounting holes 118 on the anti-wring cylinder.

A limiting groove 120 is set on the mounting flange 116 in the embodiment.

The bearing in the embodiment is a flange bearing 112. The outer ring of the bearing is fixed in the center hole of the connector 113 between the pitch axis and roll axis by the flange bearing 112, which simplifies the axial positioning and a bearing seat is no longer needed. The flange of the flange bearing 112 is fixed with outer ring. The cost is thus reduced.

Embodiment 2

Figure 7:
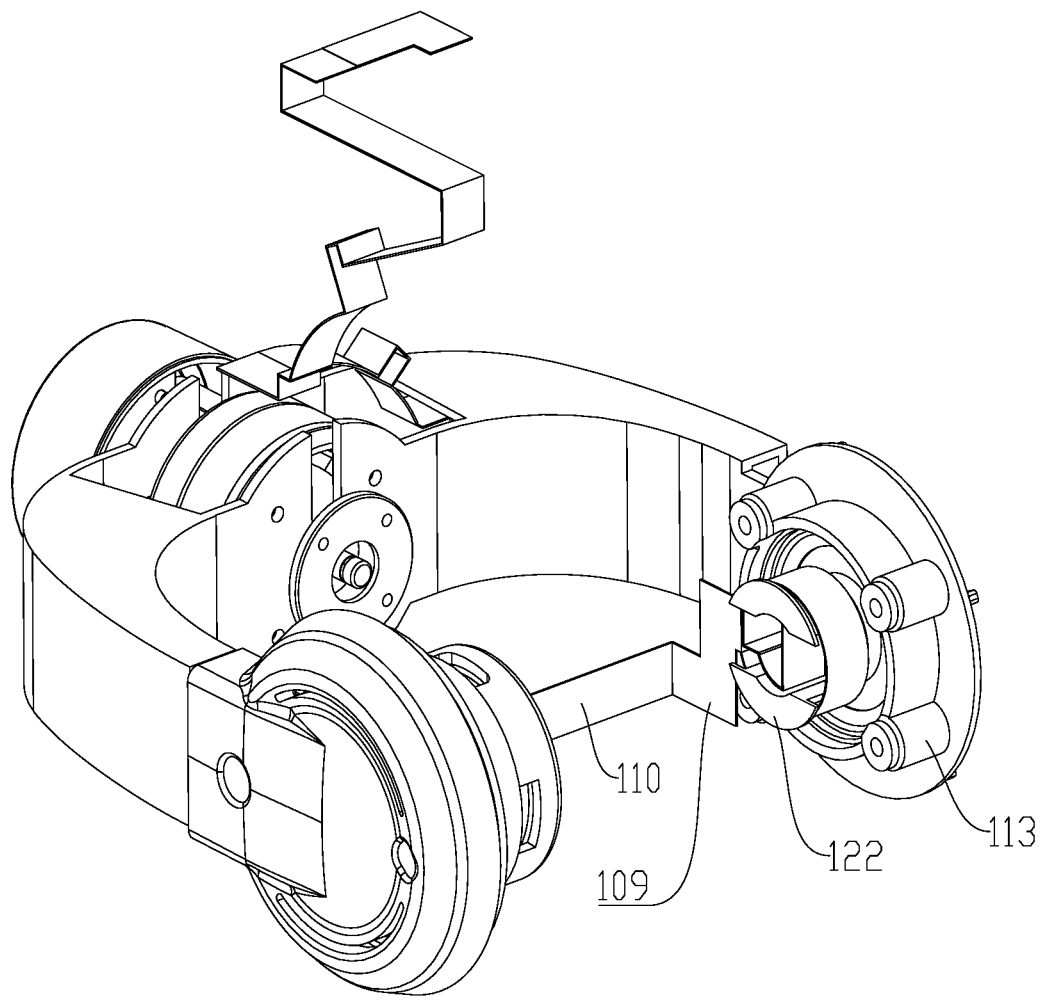
FIG. 7 is a perspective view of a structure of an anti-wring component mounted on a gimbal according to the embodiment 2 of the present invention.
Figure 8:
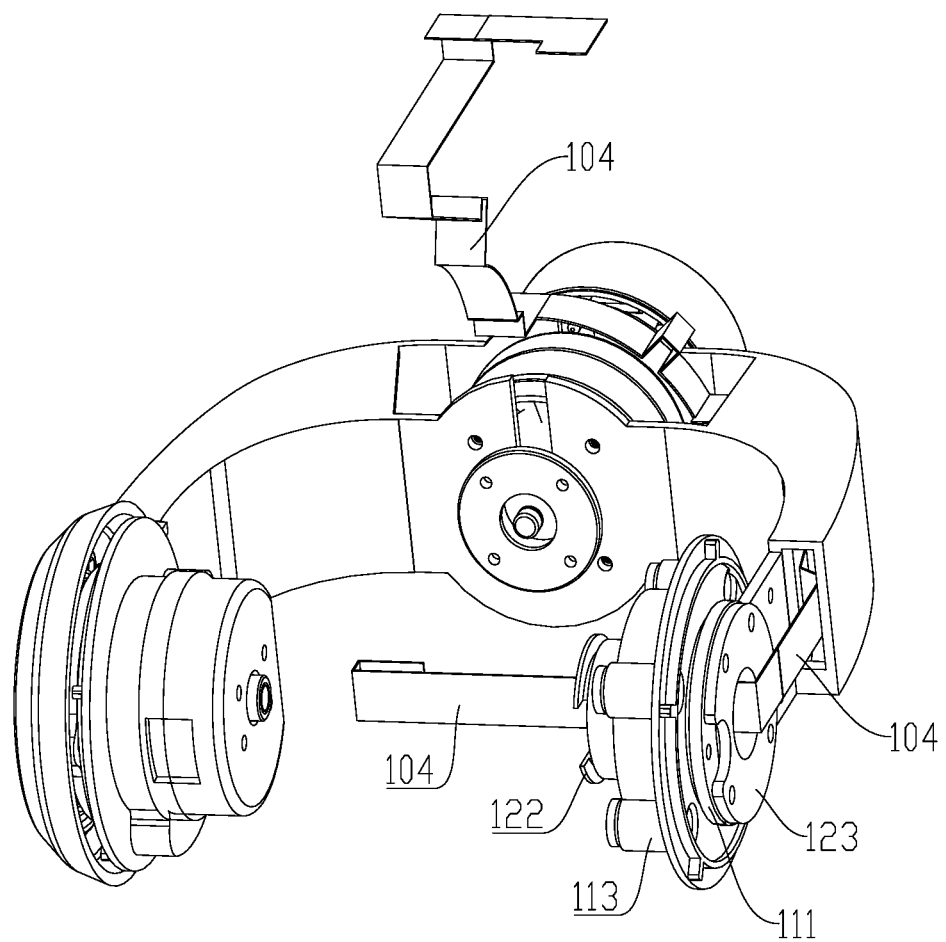
FIG. 8 is a perspective view of a structure of an anti-wring component mounted on a gimbal from a different angle according to the embodiment 2 of the present invention.
Figure 9:
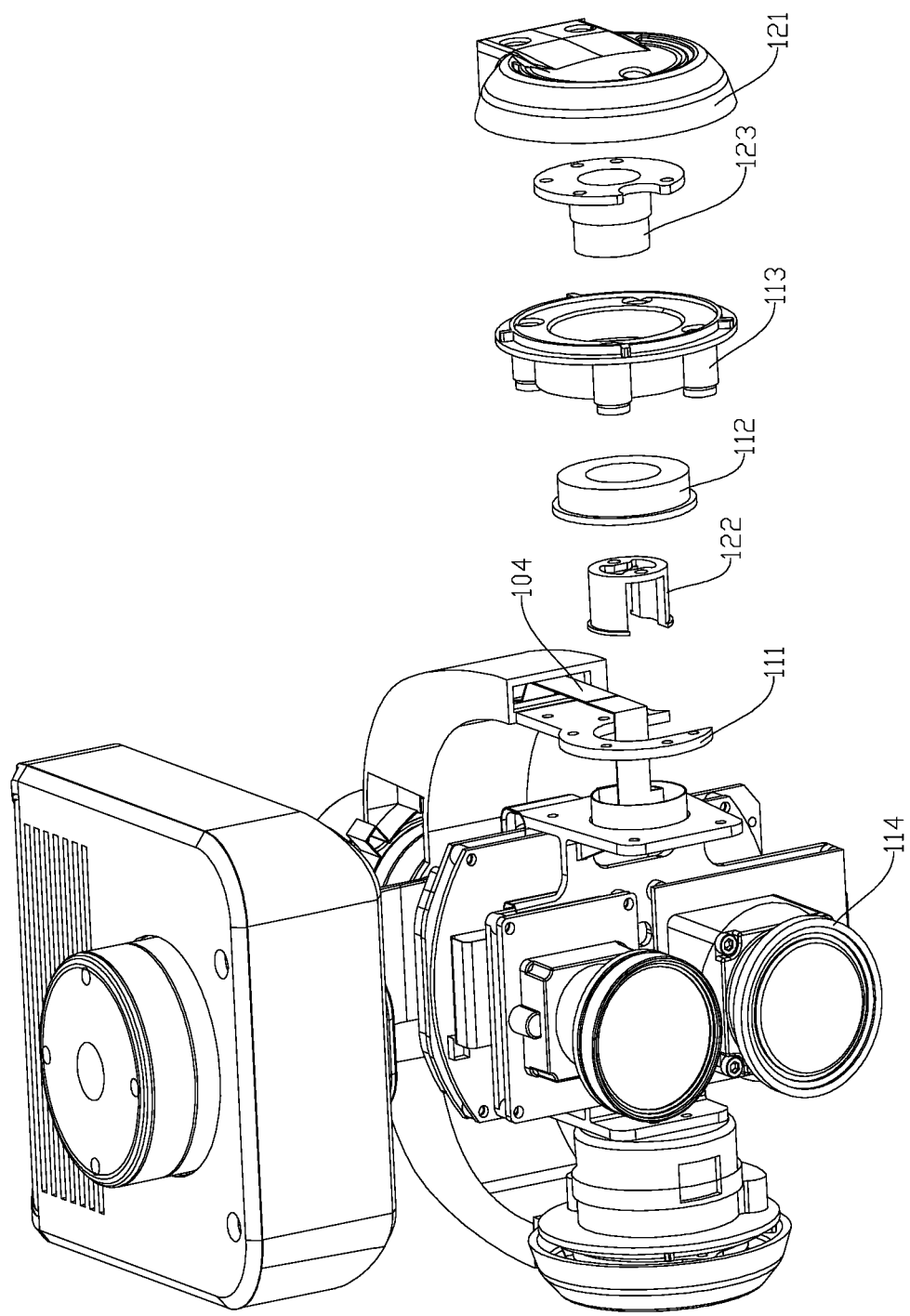
FIG. 9 is an explosive drawing of the gimbal according to the embodiment 2 of the present invention.

Referring to the FIG. 7 to FIG. 9, the embodiment 2 of the present invention provides a gimbal which comprises an earmuff 121, the roll axis U-shape arm 111, the connector 113 between the pitch axis and the roll axis and the anti-wring component provided in the embodiment 1. The supporting locating piece is fixed on the roll axis U-shape arm 111. The connector 113 between the pitch axis and the roll axis rotates around the pitch axis of the gimbal relative to the supporting locating piece. The earmuff 121 is fixed with the roll axis U-shape arm 111. The earmuff 121, roll axis U-shape arm 111 and the connector 113 between the pitch axis and the roll axis adopt conventional technology, which are not improved in the embodiment and no need for further explanation. The flange of the flange bearing 112 is fixed on the connector 113 between the pitch axis and roll axis. The hollow shaft 117 of the supporting locating piece is fixed with the inner ring of the flange bearing 112. The wire spool is fixed on the hollow shaft 117 of the supporting locating piece. The mounting flange 116 of the supporting locating piece is fixed on the roll axis U-shape arm 111. The camera 114 is connected with the connector 113 between the pitch axis and the roll axis. The camera 114 and the connector 113 between the pitch axis and the roll axis rotate around the pitch axis while the wire spool and the supporting locating piece do not rotates around the pitch axis. The rotation of the camera 114 tightens the multi-wire planar cable 104 around the peripheral wall of the anti-wring cylinder 100 along the radial direction of the anti-wring cylinder 100 to prevent the multi-wire planar cable 104 from wring and ensure the normal and continuous transmission of the data and image signal.

Embodiment 3

The embodiment 3 of the present invention provides a flying vehicle which comprises the gimbal. The gimbal is mounted on the frame of the flying vehicle.

The embodiments of the present invention are to explain the technical solution of the present invention and not a limitation of the present invention. Referring to the embodiments the present invention is illustrated in detail. A skilled technician in the field is able to modify the embodiments or replace part of or all the technical features. The modifications, alterations or replacements are within the spirit and scope of the present invention. The combinations of the technical features described in the embodiments are within the protection range of the present invention. The contents in the claims are able to be used in any combinations which are within the protection range of the present invention.

What is claimed is:

1. An anti-wring component, comprising a wire spool, a supporting locating piece and a bearing, wherein an outer ring of the bearing is fixed with a connector between a pitch axis and a roll axis of a gimbal; an inner ring of the bearing is fixed with the supporting locating piece; wherein the supporting locating piece comprises a mounting flange and a hollow shaft; the mounting flange is fixed with a first end of the hollow shaft; a shaft shoulder is set on the hollow shaft; the inner ring of the bearing is put on the hollow shaft and is limited by the shaft shoulder.

2. The anti-wring component, as recited in claim 1, wherein there are two wire lead-out holes which are set symmetrically along a radial direction of an anti-wring cylinder.

3. The anti-wring component, as recited in claim 1, wherein there are first mounting holes which are set on a first end of an anti-wring cylinder.

4. The anti-wring component, as recited in claim 3, wherein there are second mounting holes which are set on a second end of the hollow shaft.

5. The anti-wring component, as recited in claim 1, wherein there is a limiting groove which is set on the mounting flange.

6. The anti-wring component, as recited in claim 1, wherein in the bearing is a flange bearing.

7. An anti-wring component, comprising a wire spool, a supporting locating piece and a bearing, wherein an outer ring of the bearing is fixed with a connector between a pitch axis and a roll axis of a gimbal; an inner ring of the bearing is fixed with the supporting locating piece; wherein there are two wire lead-out holes which are set symmetrically along a radial direction of an anti-wring cylinder.

8. An anti-wring component, comprising a wire spool, a supporting locating piece and a bearing, wherein an outer ring of the bearing is fixed with a connector between a pitch axis and a roll axis of a gimbal; an inner ring of the bearing is fixed with the supporting locating piece wherein there are first mounting holes which are set on a first end of an anti-wring cylinder.

\* \* \* \* \*